United States Patent
Allen et al.

(10) Patent No.: US 11,420,687 B2
(45) Date of Patent: Aug. 23, 2022

(54) MULTI-FUNCTIONAL COUPLER FOR VEHICLE COMPONENTS

(71) Applicants: Christopher J Allen, Pleasant Ride, MI (US); Robert Rizzo, Macomb, MI (US); Cole T Schaenzer, Royal Oak, MI (US); Jimmy L Suder, Ortonville, MI (US); Michael Boyle, Berkley, MI (US); Jeffery E Long, Canton, MI (US)

(72) Inventors: Christopher J Allen, Pleasant Ride, MI (US); Robert Rizzo, Macomb, MI (US); Cole T Schaenzer, Royal Oak, MI (US); Jimmy L Suder, Ortonville, MI (US); Michael Boyle, Berkley, MI (US); Jeffery E Long, Canton, MI (US)

(73) Assignee: FCA US LLC, Auburn Hills, MI (US)

( * ) Notice: Subject to any disclaimer, the term of this patent is extended or adjusted under 35 U.S.C. 154(b) by 99 days.

(21) Appl. No.: 17/092,515

(22) Filed: Nov. 9, 2020

(65) Prior Publication Data
US 2022/0144350 A1    May 12, 2022

(51) Int. Cl.
*B60R 11/06* (2006.01)
*B62D 27/06* (2006.01)

(52) U.S. Cl.
CPC .............. *B62D 27/06* (2013.01); *B60R 11/06* (2013.01)

(58) Field of Classification Search
CPC .. B62D 27/06; B60R 11/06; B60R 2013/0293
USPC ......................................................... 296/1.04
See application file for complete search history.

(56) References Cited

U.S. PATENT DOCUMENTS

| | | | |
|---|---|---|---|
| 8,876,198 B2 * | 11/2014 | Erb ......................... | B62D 35/02 296/193.03 |
| 9,248,869 B2 * | 2/2016 | Neculau ................. | B62D 65/06 |
| 2020/0315302 A1 * | 10/2020 | Lee ..................... | A44B 17/0047 |

* cited by examiner

*Primary Examiner* — Pinel E Romain
(74) *Attorney, Agent, or Firm* — Ralph E. Smith

(57) ABSTRACT

A multi-functional coupler for one or more vehicle components includes a shank, a head connected to the shank, a connector carried by the shank, and a tool. The tool is carried by the head or shank spaced from the connector, and the tool has a fastener engaging portion by which a fastener may be moved to install or remove the fastener from a component. The coupler may be used to both coupled together two or more components, and to remove fasteners or other connections via the tool of the coupler. Conveniently, as the coupler is normally installed on the vehicle to couple together two or more vehicle components, the coupler is readily available to a user wanting to remove fasteners compatible/drivable with the tool of the coupler.

18 Claims, 3 Drawing Sheets

_US 11,420,687 B2_

MULTI-FUNCTIONAL COUPLER FOR VEHICLE COMPONENTS

FIELD

The present disclosure relates to a multi-functional coupler for vehicle components that includes at least one tool 34 for installation and removal of vehicle fasteners.

BACKGROUND

Vehicles include fasteners by which components are coupled together. Some vehicles include components that can be releasably connected to the vehicle by fasteners, for removal from the vehicle when needed or desired. Tools needed to remove fasteners that releasably connect components to a vehicle are separate from the vehicle components and from the fasteners, need to be separately stored and handled, and can be separated/removed from the vehicle and otherwise be unavailable or not conveniently available when needed.

SUMMARY

In at least some implementations, a multi-functional coupler for one or more vehicle components includes a shank, a head connected to the shank, a connector carried by the shank, and a tool. The tool is carried by the head or shank spaced from the connector, and the tool has a fastener engaging portion by which a fastener may be moved to install or remove the fastener from a component. The coupler may be used to both coupled together two or more components, and to remove fasteners or other connections via the tool of the coupler. Conveniently, as the coupler is normally installed on the vehicle to couple together two or more vehicle components, the coupler is readily available to a user wanting to remove fasteners compatible/drivable with the tool of the coupler.

In at least some implementations, the tool is located at an end of the shank and the connector is between the head and the tool. The connector may be defined by a threaded portion of the shank, a detent component, or a projection extending outwardly from a portion of the shank. The connector may be defined by the threaded portion of the shank, and the tool may have an outer diameter or maximum outer dimension that is less than an inner diameter of the threaded portion.

In at least some implementations, the head is at a fixed distance from the connector. The head may be connected to an end of the shank, the head may include an outer surface that faces away from the shank and the head may include an inner surface arranged to engage one of the vehicle components.

In at least some implementations, the tool includes at least one drive surface defined by a portion of the shank. In at least some implementations, the tool is located on the head. The tool may be defined by a cavity or projection on the head, and the tool may be formed integrally in the head.

In at least some implementations, the tool is located on the head and movable relative to the head from a retracted position in which at least a majority of the tool is covered by the head and an extended position in which at least a majority of the tool is exposed from the head.

In at least some implementations, a vehicle assembly, includes a first vehicle component, a second vehicle component and a coupler. The first vehicle component has a first opening. The second vehicle component has a second opening having at least a portion that is threaded and is aligned with the first opening. And the coupler has a shank with a threaded portion, an enlarged head connected to the shank, and a tool carried by the head or shank spaced from the threaded portion. The shank extends through the opening in the first vehicle component, the threaded portion is threadedly received in the threaded opening and the head overlies a surface of the first vehicle component outboard of the first opening.

In at least some implementations, the head is fixed to the shank so that the head and shank co-rotate, and the head is rotated to threadedly engage the threaded portion with the threads of the second opening. The first vehicle component may be trapped between the head and the second vehicle component.

In at least some implementations, the tool is carried by the shank and includes at least one drive surface formed in the shank, and/or a tool is located on the head. In at least some implementations, the tool is movable relative to the head from a retracted position in which at least a majority of the tool is covered by the head and an extended position in which at least a majority of the tool is exposed from the head. In at least some implementations, the tool is defined by a cavity or projection on the head.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
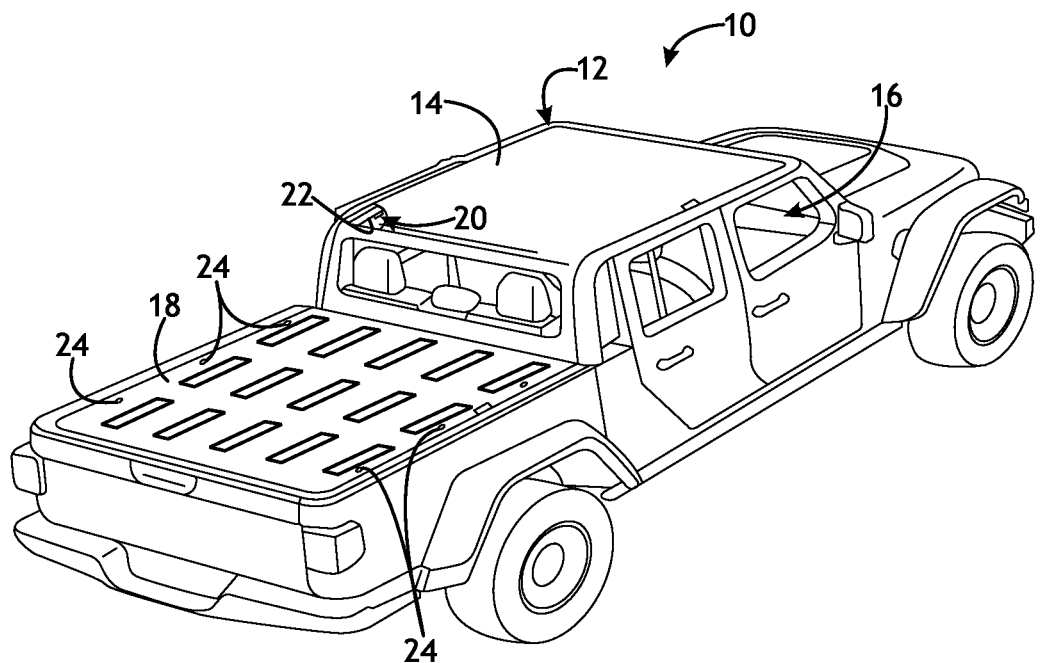
FIG. 1 is a perspective view of a vehicle including a removable cover with a multi-functional coupler.
Figure 2:
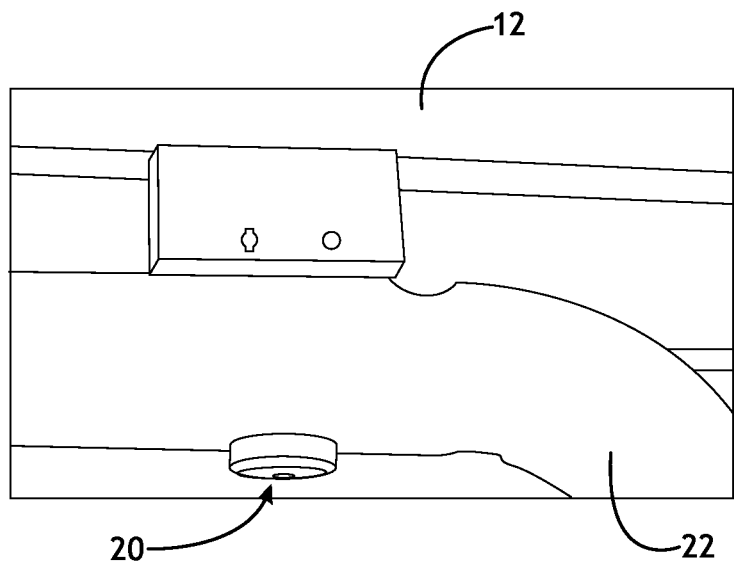
FIG. 2 is an enlarged perspective view of a portion of the vehicle showing the coupler in an installed position.
Figure 3:
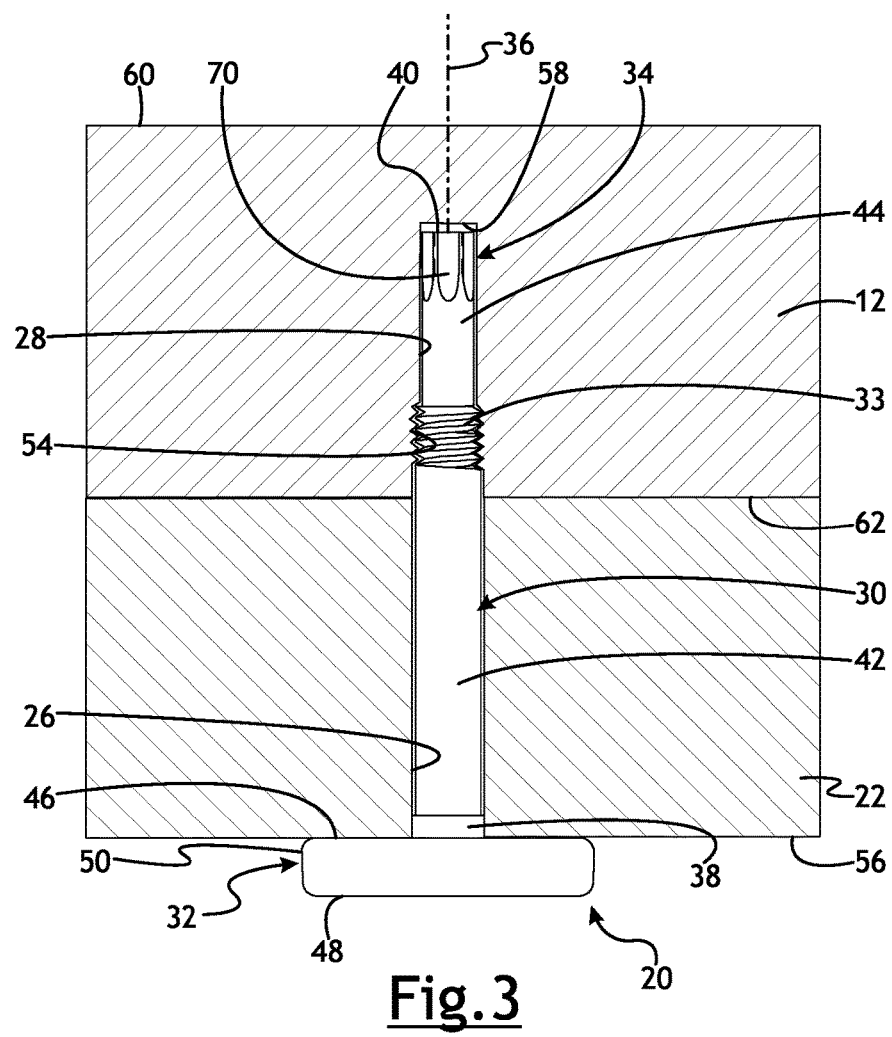
FIG. 3 is a sectional view showing the coupler in the installed position.

Referring in more detail to the drawings, FIG. 1 illustrates a vehicle 10 that includes a removable component, shown as a cover 12, that may be selectively removed and installed on the vehicle. The cover 12 may include a roof section 14 overlying a passenger compartment 16 of the vehicle 10 and a cargo section 18 overlying a cargo compartment. The cover 12 may be in one-piece or separate pieces such that all or a portion of the cover may be removed/installed as desired. As shown in FIGS. 1 and 2, the cover 12 may be secured to the vehicle 10 in the installed position by at least one coupler 20 that secures the cover 12 to a structural member 22 of the vehicle 10 or another vehicle component. The cover 12 may further be secured to the vehicle 10 by multiple fasteners 24, such as threaded fasteners adapted to be driven by any desired tool 34, such as a socket wrench, screwdriver, torx bit or the like. As shown in FIGS. 2 and 3, the coupler 20 may extend through a first opening 26 in a first vehicle component (e.g. the structural member 22) and into a second opening 28 in a second vehicle component (e.g. the cover 12), to connect the first vehicle component 22 to the second vehicle component 12, as will be described in more detail below. While described with reference to a cover and structural component, the first and second vehicle components could be other components of the vehicle, that are releasably coupled together by a coupler.

Figure 4:
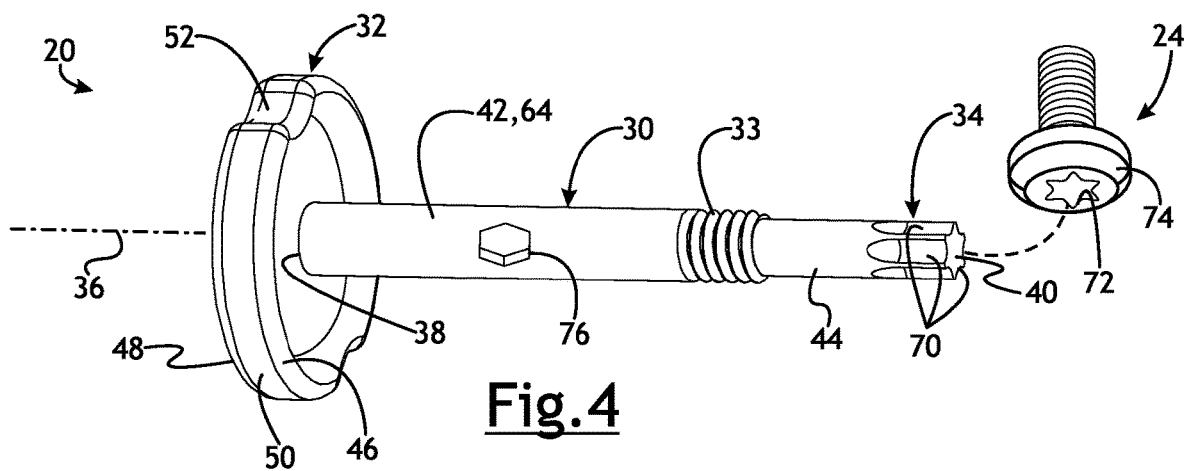
FIG. 4 is a perspective view of the coupler.

In at least some implementations, such as shown in FIGS. 2-4, the coupler 20 includes a shank 30, a head 32 connected to the shank 30, a connector 33 carried by the shank 30, and a tool 34. The shank 30 has a rotational axis 36, an axial length between a first end 38 and a second end 40, and may have any desired cross-sectional shape suitable for insertion into the first opening 26 and second opening 28. In the examples shown, the shank 30 is cylindrical although other shapes may be used. The shank 30 has a first portion 42 located between the head 32 and the connector 33 and a second portion 44 from the connector 33 to the second end 40, which may be free (i.e. not connected to any other part of the coupler). So that the shank 30 may be received through the first opening 26, the first portion 42 has an outer diameter or cross-sectional area smaller than an inner diameter of the first opening 26.

The head 32 may be fixed or otherwise connected to the shank 30 for co-rotation with the shank 30 about the axis 36. In at least some implementations, the head 32 is connected to the first end 38 of the shank 30 and the head 32 extends radially outwardly from the shank 30, and the head 32 may be coaxial with the shank 30. The head 32 has an inner surface 46, and outer surface 48 and a side surface 50 extending between the inner and outer surfaces. The inner surface 46 may be closer to the second end 40 of the shank 30 than is the outer surface 48. The inner surface 48 may face toward the second end 40 and may be perpendicular or within fifteen degrees of perpendicular to the axis 36. The head 32 may have any desired peripheral shape and may include flat surfaces or indentations 52 (FIG. 4) or projections that facilitate manually turning the head 32 to turn the shank 30 relative to the first and second vehicle components 12, 22, or to facilitate otherwise manipulating the coupler 20 relative to the vehicle components 12, 22.

As shown in FIG. 3, the connector 33 is arranged to engage and couple with a coupling feature 54 carried by or defined in the second vehicle component 12. The connector 33 and coupling feature 54 may be engaged by relative movement of the coupler 20 relative to the second vehicle component 12. In the implementations shown in FIGS. 1-4, the connector 33 is defined by threads formed in an outer surface of the shank 30 (or by a threaded component carried by (i.e. connected to) the shank 30, and the coupling feature 54 of the second vehicle component 12 is likewise defined by threads formed in the second opening 28. The shank 30 is inserted through the first opening 26 until the connector 33 engages the threads 54 in the second opening 28, and then the head 32 may be manually or otherwise rotated to threadedly engage the connector 33 and coupling feature 54. The coupler 20 may be rotated until the inner surface 46 of the head 32 is brought into engagement with an outer surface 56 of the first vehicle component 22.

In this way, as shown in FIG. 3, the first vehicle component 22 is trapped between the head 32 and the second vehicle component 12, with the coupler 20 being maintained in place by the threaded engagement between the connector 33 and coupling feature 54 of the second vehicle component 12. To achieve a desired connection (e.g. relatively tight to reduce or eliminate vibrations between the first vehicle component 22, second vehicle component 12 and/or the coupler 20), the inner surface 46 of the head 32 may be arranged at a fixed distance from the connector 33 to ensure that the head 32 firmly engages the first vehicle component 22 with the connector 33 engaged with the coupling feature 54 (e.g. threads) of the second opening 28. In this regard, the coupling feature 54 in the second opening 28 may be spaced from a bottom 58 of the second opening 28, or from a distal or inner surface 60 of the second vehicle component 12 if the second opening 28 passes through the second vehicle component 12. While shown as having the head 32 engage the first vehicle component 22, a different portion of the coupler 20 (e.g. an outwardly extending projection carried by the shank 30 or head 32) may engage the first vehicle component 22 in other implementations.

The connector 33/threads may have a larger outer diameter than the first portion 42 of the shank 30, or the threads 33 may have the same or a smaller outer diameter than the first portion 42 of the shank 30, as desired. If the threads 33 are the same or smaller diameter than the first portion 42 of the shank 30, and if the threads 54 in the second opening 28 do not start flush with a proximal or outward facing surface 62 of the second vehicle component 12, then a counterbore can be provided in the second vehicle component 12 to accommodate the first portion 42 of the shank 30.

Figure 6:
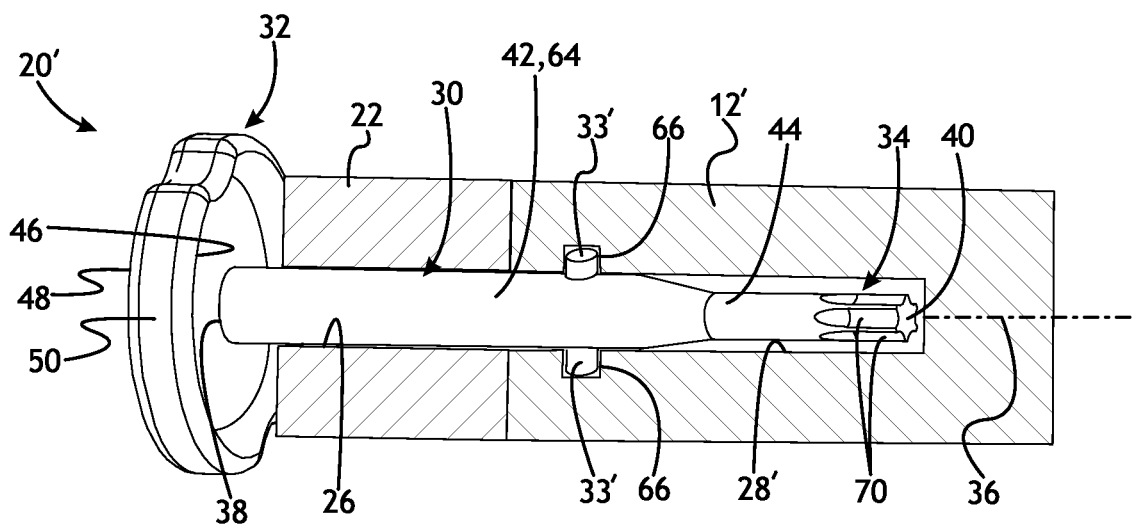
FIG. 6 is a perspective view of an alternate coupler.

FIG. 6 illustrates a coupler 20' having a connector 33' defined by one or more projections extending outwardly from or relative to the outer surface 64 of the shank 30. The head, 32, tool 34 and first vehicle component may be the same as described with reference to the coupler 20, and for ease of understanding and description, the same reference numerals are used for these components and features thereof. The projections 33' may be part of a detent mechanism including one or more detent components (e.g. the projections 33' and voids 66 in which the projections are releasably received). The projections 33' may be spring-biased or flexible to permit retraction or flexing perpendicular to the axis 36. The projections 33' can then retract or flex to permit insertion through an opening (e.g. first opening 26 and/or second opening 28') smaller than the unflexed/not retracted size/width of the projections with an axial force applied to the coupler 20', until the projections 33' are aligned with mating coupling features, shown as voids 66, open to the second opening 28 whereupon the projections 33' return to or toward their unflexed/not retracted position and are received at least partially in the voids 66, and overlapping the second vehicle component 12'. The projections 33' may be arranged so that the force need to flex or retract them is suitable to retain the position of the coupler 20' in the installed position. The coupler 20' can likewise be removed with an opposite axial force sufficient to overcome the retention force between the projections 33' and the second vehicle component 12' (within the coupling features/voids). The projections could be carried by the second vehicle component 12' and extend into the second opening 28, and the coupler 20' could include the voids (or the second vehicle component 12' and coupler 20' may each include at least one void and at least one projection). The projections 33' could instead be rigid and not retractable and received within an axially inclined track (e.g. similar to a single thread) in the second vehicle component 12' whereupon rotation of the coupler 20' would move the projections 33' relative to the track and pull the head 32 into engagement with the first vehicle component 22. In such an implementation, the first opening 26 could be cylindrical and have a large enough inner diameter to accommodate the projections or the first opening 26 could include an axially extending slot open to the remainder of the first opening 26 and in which the projections may be received.

The projections 33' could extend in any desired orientation from the shank 30. The projections (threads, detent members, etc.) or other connector 33 (e.g. the second vehicle component 12' could include a projection and the coupler 20' may include a connector 33 including a void, as noted above) provide a mechanism by which overlapped surfaces of the coupler 20, 20' and second vehicle component 12, 12' retain the coupler 20, 20' in position relative to the second vehicle component 12, 12', to trap the first vehicle component 22 between a portion of the coupler 20, 20' (e.g. the head 32) and second vehicle component 12, 12'.

Returning to FIG. 4, in addition to coupling the first vehicle component 22 to the second vehicle component 12, the coupler 20 may include at least one tool 34 useful to install or remove other vehicle fasteners. The tool 34 may be carried by the head 32 or shank 30, may be spaced from the connector 33, and the tool 34 may have a fastener engaging portion 68 with at least one drive surface 70 by which a fastener, such as fasteners 24, may be moved (e.g. rotated) to install or remove the fastener 24 from a component. In at least some implementations, as shown in FIGS. 3-6, the tool 34 may be located at the second end 40 of the shank 30, opposite to the head 32, and the drive surfaces 70 may start at the second end 40 and extend axially toward the first end 38 any desired distance. In at least some implementations, the tool 34 may be designed to engage and rotate a threaded fastener, and the fastener engaging portion 68 may have any desired shape to mate with engagement surfaces of a fastener.

The drive surface(s) 70 of the tool 34 may be defined by one or more external surfaces of the tool 34 (e.g. formed in or defined by an external surface 64 of the shank 30) to engage, as shown in FIG. 4, interiorly formed engagement surfaces 72 in the head 74 of a fastener 24, like slots or voids of any shape. Or the drive surfaces 70 may be defined by one or more internal surfaces of a void formed in the tool 34, such as a cavity or socket formed in the second end 40 of the shank 30, to engage engagement surfaces arranged on the exterior of a fastener (e.g. outwardly facing surfaces of a head of the fastener). Or the tool 34 may include at least one each of external and internal drive surfaces 70 to engage a fastener 24 having interiorly and exteriorly arranged engagement surfaces. The drive surfaces 70 may extend axially and may extend to the second end 40 of the shank 30, in at least some implementations. The tool 34 including the fastener engaging portion 68 may be sized for receipt into the second opening 28 which may include threads 54, and so the tool 34 has an outer diameter or maximum outer dimension that is less than an inner diameter of the threaded portion, or the peripheral size of the tool 34/engaging portion 68 may be less than that of the connector 33 of the coupler 20. In the example shown in the drawings, the tool 34 includes multiple driving surfaces 70 arranged in the manner of a torx tool 34 for engagement with a torx fastener 24.

When the tool 34 is coupled to a fastener 24, the head 32 may be rotated about the axis 36 to rotate the fastener 24 for installation or removal of the fastener. The fastener engaging portion 68 could instead or in addition be defined by a void 76 formed in the shank 30, spaced from the second end 40, and which may extend perpendicular to the axis 36. When a fastener head 32 is received at least partially within a void formed in this manner, the tool 34 may be rotated about an axis 36 of the void, perpendicular to the axis 36 of the shank 30, to rotate a fastener.

Accordingly, the coupler 20 may be used to connect a first vehicle component 22 to a second vehicle component 12. In the example shown, the coupler 20 is one of many connectors/fasteners used to connect a vehicle's removable roof 12 to the vehicle 10. The coupler 20 may conveniently be manually rotated by grasping and turning the head 32 to install and remove the coupler 20 from the vehicle components 12, 22. The coupler 20 may then be used to remove other vehicle fasteners 24 via the tool 34, including other fasteners coupling the roof to the vehicle, or for other components, like a cargo cover, or to remove/reattach a removable door from/to the vehicle, for example. Desirably, the coupler 20 may remain with the vehicle 10 to avoid the need for a separate tool to remove other fasteners, to facilitate removal or installation of fasteners even when other tools are not available.

Figure 5:
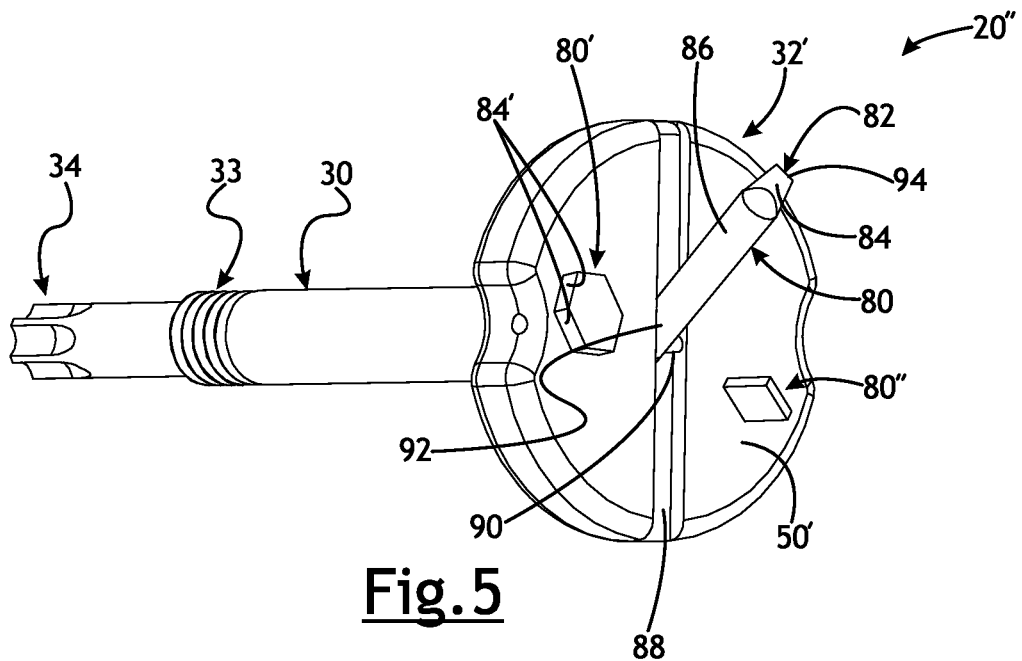
FIG. 5 is a perspective view of an alternate coupler.

The coupler 20" shown in FIG. 5 includes one or more other tools carried by the head 32', and also a tool 34 (which may be referred to as a first tool) carried at the second end 40 of the shank 30 as described above with respect to the coupler 20 of FIGS. 1-4. The coupler 20" may be the same as the coupler 20 of FIGS. 1-4 with the exception of the one or more other tools, and for ease of description the same reference numbers will be used to refer to the same or similar components of this coupler 20".

A second tool 80 may include a fastener engaging portion 82 with at least one drive surface 84 arranged to engage a fastener to facilitate rotating a fastener. The fastener engaging portion 82 of the second tool 80 may be configured as described above with respect to the first tool 34, or otherwise as desired. The second tool 34 may have a shank 86 that may extend outwardly from the head 32' in any desired direction, may be fixed to the head 32', and may be movable or not movable relative to the head 32'. In the implementation shown in FIG. 5, the second tool 80 is movable relative to the head 32' from a retracted position in which at least a majority of the second tool 80 is covered by the head 32' and an extended position in which at least a majority of the tool 80 is exposed from the head 32'. In this regard, the head 32' may include a void 88, shown as a slot in FIG. 5, and the second tool 80 may be pivoted relative to the head 32' from a retracted position in which more and up to all of the second tool 80 is received in the void 88 and covered or overlapped by the head 32' so the second tool 80 is flush or recessed in from the outer surface 50' of the head 32, to an extended position in which most of the second tool 80 is exposed out of the void 88. In FIG. 5, the second tool 88 is shown in an intermediate position between the retracted and extended positions. The second tool 80 may be connected to the head 32' at a pivot 90 at or near a first end 92 of the shank 86 of the second tool 80, and the drive surface(s) 84 may be arranged at a second end 94 of the shank 86, or otherwise spaced from the pivot 90. Rather than being carried by the head 32', the second tool 80 could instead be pivoted to the shank 30, and when retracted, received within a slot formed in the shank 30, if desired.

A second tool 80' could instead be defined by a cavity formed in the head 32' of the coupler 20, as shown in FIG. 5. The cavity defining the second tool 80' may have internal drive surfaces 84' and the cavity designed to receive a head of a fastener having exteriorly arranged engagement surfaces. The cavity-shaped tool 80' could be coaxial with the axis 36 of the coupler 20, 20', 20" or offset from the axis 36, as desired. Multiple such cavities, for example of different sizes and/or shapes, may be provided in the head of a coupler 20, 20', 20". A second tool 80" could instead by defined by one or more projections formed integrally with the head 32' and arranged to engage the engagement surfaces of a fastener. A representative projection defining a tool 80" is shown in FIG. 5 and extends generally perpendicular from the outer surface 50' of the head 32', and parallel to the axis 36. This projection 80" is arranged for receipt in a slot of a fastener. While shown offset from the axis 36, the projection 80" could be centered on the axis 36, if desired. Any number of projections may be provided to enable use of the coupler with fasteners having different sizes or shapes of engagement surfaces.

The cavity 80' and/or projection 80" could be formed integrally in the head 32', in the same piece of material as the head 32', as desired. When the head 32' is formed from more than one piece of material, the cavity 80' and/or projection 80" could be formed in the piece of material of the head 32 defining the outer surface.

Any of the tools 80, 80', 80" referred to as second tools can be provided instead of the first tool 34. That is, a coupler need not have a tool at or adjacent to the second end 40 of the shank 30, the shank 30 could terminate at the connector 33, if desired. And a coupler may include any number of tools, as desired. All or a part of a cavity or projection may define a tool engaging portion of such a tool.

What is claimed is:

1. A multi-functional coupler for one or more vehicle components, comprising:
   a shank;
   a head connected to the shank;
   a connector carried by the shank; and
   a tool carried by the head or shank spaced from the connector, and the tool having a fastener engaging portion by which a fastener may be moved to install or remove the fastener from a component.

2. The coupler of claim 1 wherein the tool is located at an end of the shank and the connector is between the head and the tool.

3. The coupler of claim 2 wherein connector is defined by a threaded portion of the shank, a detent component, or a projection extending outwardly from a portion of the shank.

4. The coupler of claim 3 wherein the connector is defined by the threaded portion, and the tool has an outer diameter or maximum outer dimension that is less than an inner diameter of the threaded portion.

5. The coupler of claim 1 wherein the head is at a fixed distance from the connector.

6. The coupler of claim 5 wherein the head is connected to an end of the shank, the head includes an outer surface that faces away from the shank and the head includes an inner surface arranged to engage one of the vehicle components.

7. The coupler of claim 1 wherein the tool includes at least one drive surface defined by a portion of the shank.

8. The coupler of claim 1 wherein the tool is located on the head.

9. The coupler of claim 1 wherein the tool is located on the head and movable relative to the head from a retracted position in which at least a majority of the tool is covered by the head and an extended position in which at least a majority of the tool is exposed from the head.

10. The coupler of claim 8 wherein the tool is defined by a cavity or projection on the head.

11. The coupler of claim 10 wherein the tool is formed integrally in the head.

12. A vehicle assembly, comprising:
    a first vehicle component having a first opening;
    a second vehicle component having a second opening having at least a portion that is threaded and is aligned with the first opening; and
    a coupler having a shank with a threaded portion, an enlarged head connected to the shank, and a tool carried by the head or shank spaced from the threaded portion, wherein the shank extends through the opening in the first vehicle component, the threaded portion is threadedly received in the threaded opening and the head overlies a surface of the first vehicle component outboard of the first opening.

13. The assembly of claim 12 wherein the head is fixed to the shank so that the head and shank co-rotate, and wherein the head is rotated to threadedly engage the threaded portion with the threads of the second opening.

14. The assembly of claim 12 wherein the first vehicle component is trapped between the head and the second vehicle component.

15. The assembly of claim 12 wherein the tool is carried by the shank and includes at least one drive surface formed in the shank.

16. The assembly of claim 12 wherein the tool is located on the head.

17. The assembly of claim 16 wherein the tool is movable relative to the head from a retracted position in which at least a majority of the tool is covered by the head and an extended position in which at least a majority of the tool is exposed from the head.

18. The assembly of claim 17 wherein the tool is defined by a cavity or projection on the head.

* * * * *